(12) United States Patent
Krueger et al.

(10) Patent No.: US 11,874,157 B2
(45) Date of Patent: Jan. 16, 2024

(54) METHOD FOR DETERMINING AN AXLE LOAD AND SUSPENSION SYSTEM FOR A VEHICLE

(71) Applicant: ZF CV Systems Hannover GmbH, Hannover (DE)

(72) Inventors: Tristan Krueger, Hannover (DE); Thomas Wolf, Barsinghausen (DE)

(73) Assignee: ZF CV Systems Europe BV, Brussels (BE)

( * ) Notice: Subject to any disclaimer, the term of this patent is extended or adjusted under 35 U.S.C. 154(b) by 433 days.

(21) Appl. No.: 17/299,345

(22) PCT Filed: Nov. 27, 2019

(86) PCT No.: PCT/EP2019/082698
§ 371 (c)(1),
(2) Date: Jun. 3, 2021

(87) PCT Pub. No.: WO2020/126363
PCT Pub. Date: Jun. 25, 2020

(65) Prior Publication Data
US 2022/0057252 A1    Feb. 24, 2022

(30) Foreign Application Priority Data
Dec. 18, 2018    (DE) .................. 10 2018 132 697.1

(51) Int. Cl.
*G01G 19/08*    (2006.01)
*B60G 11/04*    (2006.01)

(52) U.S. Cl.
CPC ............. *G01G 19/08* (2013.01); *B60G 11/04* (2013.01); *B60G 2202/112* (2013.01); *B60G 2400/252* (2013.01); *B60G 2400/60* (2013.01)

(58) Field of Classification Search
CPC .... G01G 19/08; B60G 9/003; B60G 17/0182; B60G 11/04; B60G 19/12; B60G 17/017;
(Continued)

(56) References Cited

U.S. PATENT DOCUMENTS 5,161,628 A    11/1992  Wirth
5,973,273 A *  10/1999  Tal ........................ G01G 19/08
                                                     177/136
(Continued)

FOREIGN PATENT DOCUMENTS

CN    1585703 A    2/2005
CN    1930012 A    3/2007
(Continued)

OTHER PUBLICATIONS

European Patent Office, Rijswijk, Netherlands, International Search Report of International Application No. PCT/EP2019/082698, dated Mar. 12, 2020, 2 pages.

*Primary Examiner* — Jacques M Saint Surin
(74) *Attorney, Agent, or Firm* — Dickinson Wright PLLC

(57) ABSTRACT

A method for determining an axle load and a suspension system are configured for a vehicle having at least one leaf spring connected at its ends in spring holders of a vehicle body and connected in its central region to a chassis of the vehicle. The following steps are performed: measuring a measurement distance of the vehicle body relative to the chassis; determining whether there is currently a loading or unloading process of the vehicle, determining a relevant hysteresis curve of a pre-stored hysteresis field depending on the determination of a loading or unloading process, and determining a current axle load projection value from the measurement distance and the relevant hysteresis curve. A loading process criterion and an unloading process criterion may be considered. The determined axle load projection
(Continued)

value thus serves as a projected or estimated axle load. Furthermore, the hysteresis field can be updated.

16 Claims, 4 Drawing Sheets

(58) Field of Classification Search
CPC .......... B60G 2800/70; B60G 2400/252; B60G 2200/31; B60G 2400/60; B60G 2202/112
USPC .......................................................... 177/1
See application file for complete search history.

(56) References Cited

U.S. PATENT DOCUMENTS

| | | | |
|---|---|---|---|
| 6,590,168 B2 | 7/2003 | Kawaguchi et al. | |
| 6,688,168 B1 * | 2/2004 | Elliott | G01G 19/022 73/146 |
| 6,803,530 B2 * | 10/2004 | Carlstrom | G01G 23/3728 177/136 |
| 8,374,748 B2 * | 2/2013 | Jolly | B60G 17/015 180/197 |
| 9,387,742 B2 * | 7/2016 | Van Raaphorst | B60G 17/0161 |
| 9,469,303 B2 * | 10/2016 | Czaja | B60W 40/13 |

FOREIGN PATENT DOCUMENTS

| | | |
|---|---|---|
| CN | 101391568 A | 3/2009 |
| DE | 102017009146 A1 | 4/2018 |
| DE | 102017111054 A1 | 11/2018 |
| EP | 1571429 A2 | 9/2005 |
| EP | 1604179 A2 | 12/2005 |
| EP | 2072294 A1 | 6/2009 |
| GB | 1310889 A | 3/1973 |
| GB | 1479192 A | 7/1977 |
| KR | 100884233 B1 | 2/2009 |
| KR | 20120138092 A | 12/2012 |
| KR | 101504573 B1 | 3/2015 |
| WO | 03044471 A2 | 10/2002 |
| WO | 2012053869 A2 | 10/2011 |
| WO | 2015082797 A1 | 11/2014 |

* cited by examiner

METHOD FOR DETERMINING AN AXLE LOAD AND SUSPENSION SYSTEM FOR A VEHICLE

TECHNICAL FIELD

The invention relates to a method for determining an axle load and a suspension system for a vehicle which is particularly suitable for carrying out the method.

The determination of axle loads is used in particular to determine the load state, the distribution of the load and the total vehicle mass. The determined axle loads can be used to control braking processes or driving dynamics controls. It is also possible to prevent overloading of the vehicle, which can lead to damage to the vehicle and the road and significantly extend the braking distance.

BACKGROUND

Suspension systems for vehicles can be formed by air springs or air bellows, i.e. pneumatically, which is however relatively expensive. Air springs allow a measurement of their air pressure to determine the acting axle load, and furthermore an active change in the level control and the acting axle load. The axle load can also be determined by measuring the distance of the vehicle body relative to the chassis.

Furthermore, suspension systems with metallic leaf springs are known, which are generally connected with their ends to the vehicle body and are in contact with or accommodated by the chassis in their central region, in particular with a star axle of the chassis. Such suspension systems with leaf springs are generally relatively inexpensive; inaccurate determination of the axle load, in particular due to the occurring hysteresis properties, is generally considered to be disadvantageous.

Leaf springs may be formed on the one hand as parabolic springs with one or more spring leaves (spring layers), which are connected at their ends to the body of the vehicle. Furthermore, leaf springs as trapezoidal springs with several spring layers are known, in particular with different length spring leaves, which are for example threaded or installed on a center bolt and are held together at their ends by holding clamps, for example. Such trapezoidal springs may have in particular progressive spring characteristics, which thus initially allow a soft suspension or a small modulus of elasticity for small compressions, and for larger compression travel or compressions enable a larger modulus of elasticity. In particular, trapezoidal springs have a pronounced damping behavior since the multiple spring layers or spring leaves rub against each other and thereby can absorb kinetic energy.

However, it turns out that with such trapezoidal springs a determination of the axle load is problematic. Thus, a direct determination of the force or axle load is generally only inaccurate or difficult by means of additional strain gauges, or an intervention in the suspension system is required in order to install a suitable measuring device directly indicating the axle load.

EP 1 571 429 B1 discloses a device for displaying an axle load of a vehicle in a vehicle body with an air suspension.

U.S. Pat. No. 6,590,168 B2 describes a measuring device that measures a deflection angle of an axle and determines an axle load from this.

EP 1 604 179 B1 describes an axle load detection system for a vehicle with an air bellows support system using a pressure sensor to measure the pressure in an air bellows.

GB 1479192 A describes a hysteresis correction in which a range is set between an upper and lower predetermined value of the weight and a new determined value is compared with a previous weight value and a deviation due to hysteresis.

SUMMARY

The invention is based on the object to create a suspension system and a method for determining an axle load, which allow a relatively reliable determination or estimation of an axle load with relatively little effort.

This object is achieved by a method and a suspension system as claimed in the independent claims. The subordinate claims describe preferred further developments.

The method according to the invention is provided in particular for the use of the suspension system according to the invention; the suspension system according to the invention is provided in particular for carrying out the method according to the invention.

With the method according to the invention and the suspension system according to the invention, an axle load projection value or an axle load reference value is determined, which can be updated subsequently and can be used in the various systems of the vehicle as the value of the axle load; i.e. the determined axle load projection value thus represents the current axle load, or the axle load projected from the available data.

The invention is based in particular on the idea of measuring a measurement distance of the vehicle body relative to the chassis, which as such is initially influenced by hysteresis effects, already during a loading or unloading process, in which the compression state or the compression travel of the leaf spring is changed. Subsequently, a hysteresis-adjusted prediction or estimation of the current axle load is enabled by determining an axle load projection value or an axle load reference value. Since errors in the axle load nominally determinable during a loading or unloading process are caused by hysteresis, an axle load projection value is first determined from the directly measured measurement distance based on stored and/or learned hysteresis curves of a hysteresis field. Only after "shaking free" the clamped leaf spring, which can be determined by a second criterion provided for this purpose, is a realistic compression travel of the leaf spring set, which can then be produced directly by measuring the measurement distance and can be used on the one hand as a new or corrected axle load projection value and also for an evaluation or correction of the hysteresis curves.

Thus, a measurement distance of the vehicle body relative to the vehicle is measured. The measurement distance can be determined in particular by a measuring device provided on the vehicle body, which determines the measurement distance to the chassis. In particular, the measurement distance can be determined to a star axle of the chassis, which connects two vehicle wheels. However, it is also possible to determine the measurement distance between other reference variables of the vehicle body and the chassis.

The distance measuring device can, on the one hand, mechanically measure a measurement distance or a length, for example by means of a pivoting lever or another actuating device, and for example can capture a measurement variable as a measurement angle or a measurement length. Furthermore, the use of contactless measuring devices, for example an ultrasonic sensor, is also possible. Here, there is already an advantage of the invention in that known cost-effective distance measuring devices of air suspension systems can be used.

From the measured measurement distance, a current axle load projection value or axle load reference value is determined with stored and/or learned values of a hysteresis field. For this purpose, it is first determined whether a loading or unloading process is occurring, and then according to this evaluation a suitable hysteresis curve of the stored hysteresis field is determined, which is then used.

According to the invention, it is advantageously assumed that the compression and expansion processes of the leaf spring can generally be represented by an ideal spring characteristic curve, which describes a reversible elastic spring compression and spring expansion process. Here it is recognized that the spring characteristic curve, which is represented for example by value pairs of the measurement distance and the axle load, is also achieved in the vehicle when meeting a relaxation criterion (second criterion) or is achieved to a good approximation, so that this ideal spring characteristic curve can then be applied. The second criterion may indicate in particular that the vehicle has previously completed a journey in which the vibrations and small spring compression and spring expansion processes compensate or release the tensions and frictional forces between the spring leaves or spring layers. Thus, after a journey with sufficient travel time and/or sufficient travel distance for example, possibly when meeting further conditions such as additionally a sufficient minimum speed, a starting point on the ideal spring characteristic curve can be assumed. Thus, in particular, a loading or unloading process can then be detected, for which a first criterion (loading process criterion) is advantageously provided in addition, which for example indicates that the vehicle is at a standstill, or which can also be met when a corresponding signal is input by the driver.

Thus, the control and evaluation device recognizes that a change of the axle load is carried out from a point on the ideal spring characteristic curve, wherein it is subsequently determined on the basis of the measurement signals whether the measurement distance is increased, which can then be detected for example as a spring compression and loading process, or is reduced according to the measurement distance, which can be detected as a spring expansion or unloading process.

Thus, according to the invention it is advantageously assumed that this spring compression process or spring expansion process starting from the ideal spring characteristic curve can be reproduced well or with sufficient accuracy by hysteresis curves of a hysteresis field, in particular pre-stored and/or learned hysteresis curves, and thus the subsequently measured change of the measurement distance can be assigned to a current axle load projection value, which can thus subsequently be used as the current axle load for regulation and control.

Advantageously, an update of the determined axle load projection value and also of the hysteresis field is carried out by first resetting the second criterion and subsequently checking whether this second criterion is subsequently met again, i.e. there is a sufficient travel of the vehicle that leads to the release of the internal stresses of the leaf spring, for example. Then it can in turn be assumed that a point on the ideal spring characteristic curve has been reached again. If this is met, a current axle load projection value can be determined directly with high accuracy by means of the currently measured measurement distance and the ideal spring characteristic curve, which thus replaces the previously estimated axle load projection value, i.e. determined based on the hysteresis during the loading or unloading process. The deviation of this current corrected axle load projection value from the axle load projection value previously determined based on the hysteresis during the loading or unloading process can subsequently be used as a correction deviation to correct the entire hysteresis curve of the hysteresis field, since it can be assumed that the acting axle load has not changed during the journey and thus the change of the determined axle load projection value is related to on an error of the last assumed hysteresis curve. In particular, the entire hysteresis field can be corrected on the basis of this determined deviation.

Thus, in addition to a current determination of the axle load projection value, continuous correction and updating of the hysteresis field can be carried out.

The axle load projection values determined according to the invention thus correspond to the currently determined axle load, or the axle load can be projected or estimated according to invention as the axle load projection value, so that suitable values of the axle load are available for regulating and control methods.

On the one hand, the hysteresis field can have only a single first (upper) hysteresis curve, which represents a process of loading an empty vehicle. Furthermore, the hysteresis field may also have several first (upper) hysteresis curves for the loading process, for example as a set or field of hysteresis curves, which represent hysteresis curves for loading processes from different initial values or initial axle loads, for example for a previously partially loaded vehicle or for other reasons such as attachments, tank filling, etc. Accordingly, multiple second (lower) hysteresis curves can also be stored for the unloading process.

The hysteresis curves can be determined from the measured values on the one hand by interpolation of multiple measured values or based on a mathematical model by evaluation of a polynomial of the $n^{th}$ degree.

The invention is explained in more detail below on the basis of the accompanying drawings of an embodiment.

DETAILED DESCRIPTION OF THE DRAWINGS

Figure 1:
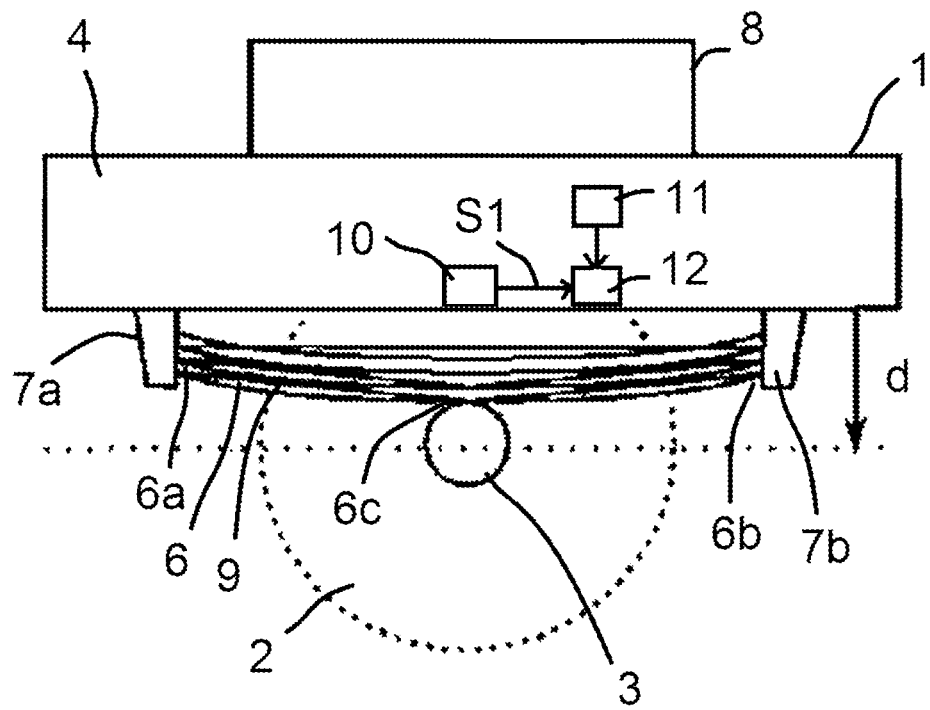
FIG. 1 shows an axle suspension of a vehicle with a leaf spring.

FIG. 1 shows a region of an axle suspension of a vehicle 1, in particular a commercial vehicle, with vehicle wheels 2, wherein the vehicle wheels 2 are mounted on a common rigid axle 3. A vehicle body 4 is suspended relative to the rigid axle 3 by means of a suspension system 5 with two lateral leaf springs 6. In the side view of FIG. 1 a vehicle wheel 2 and a leaf spring 6 are shown accordingly.

The leaf spring 6 is accommodated at its front and rear ends 6a, 6b in spring holders 7a, 7b of the vehicle body 4 and is accommodated on the rigid axle 3 in its central region 6c, i.e. it rests on the rigid axle 3 and is fixed to it. Thus, vertical movements of the body 4 lead to a compression and expansion of the leaf spring 6, i.e. a measurement distance d of the vehicle body 4 relative to the rigid axle 3 changes. During a spring compression process, for example when crossing a speed bump, the vehicle body 4 is displaced towards the rigid axle 3, i.e. the measurement distance d decreases under elastic deformation of the leaf spring 6, which is thus forced upwards in its central region 6c.

The measurement distance d is in particular also represented as a function of a load 8, which according to FIG. 1 is symbolically accommodated on the vehicle body 4. In the case of a multi-axle vehicle, the axle load distribution of the load 8 will generally also have to be taken into account.

The leaf spring 6 is formed according to the embodiment shown in FIG. 1 as a stack of spring layers 9, i.e. there are multiple spring layers 9 which are layered on each other. In the case of a design of the leaf spring 6 as a trapezoidal spring, the spring layers 9 are generally formed in different lengths and each has a central bore, through which a common so-called heart bolt is set; furthermore, the spring layers 9 are held together by clamps. Furthermore, the leaf spring 6 can also be formed in principle as a parabolic spring with one spring layer 9 or even a stack of spring layers.

The method according to the invention is in particular advantageously implemented when designing the leaf spring 6 as a trapezoidal spring with different length spring layers 9, since the hysteresis effects or damping properties described below come particularly to bear.

The measurement distance d is measured by a distance measuring device 10, which can be in the form of a mechanical distance sensor, which is in contact with the vehicle body 4 and the rigid axle 3, or also as a contactless measurement distance sensor, for example an ultrasonic sensor, such as can in principle also be provided with a pneumatic suspension system. The distance measuring device 10 provides the distance measurement signal S1 to a control and evaluation device 12, which stores the measurement data and data calculated from this in an internal or external memory 11.

Figure 2:
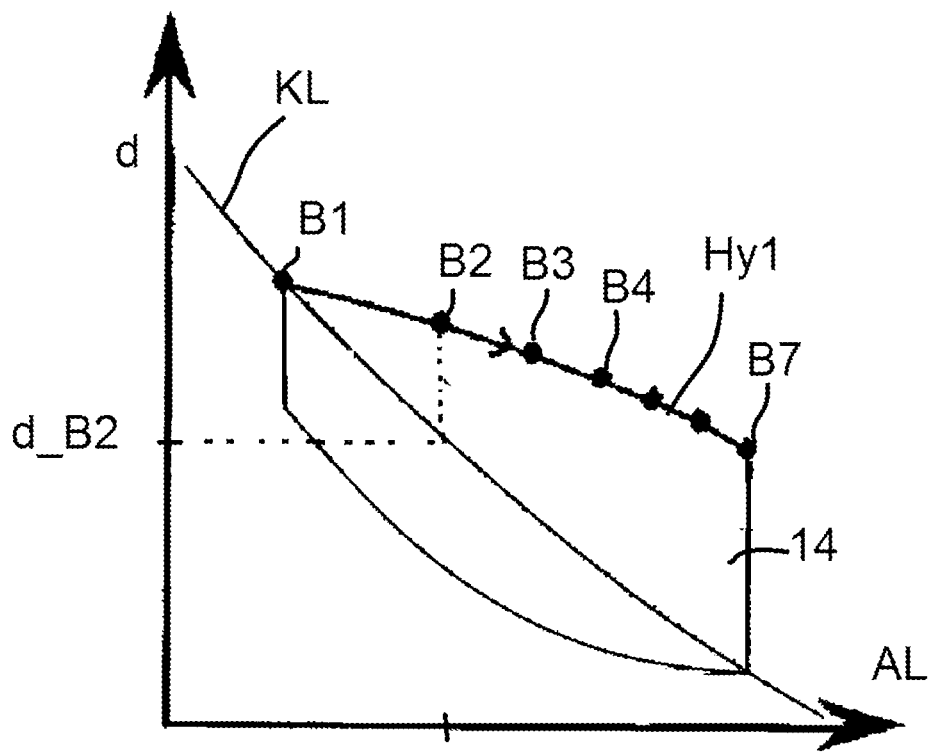
FIG. 2 shows a characteristic field with a representation of spring compression processes (loading processes)
Figure 3:
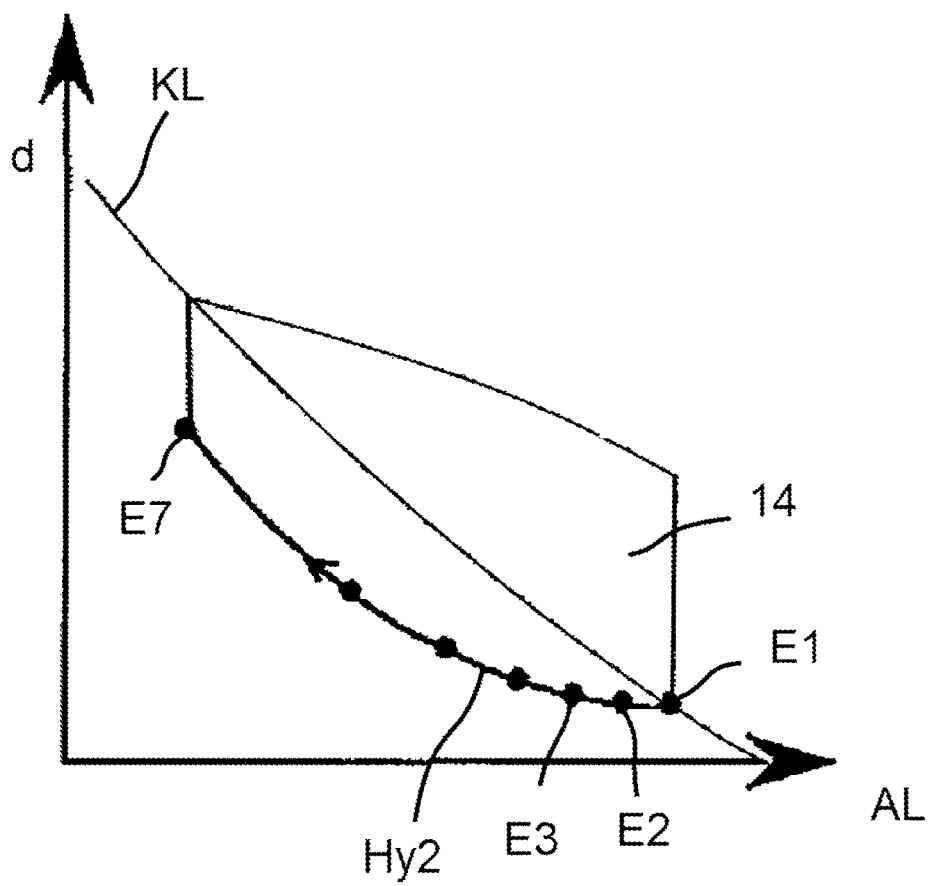
FIG. 3 shows a characteristic field with a representation of spring expansion processes (unloading processes)
Figure 4:
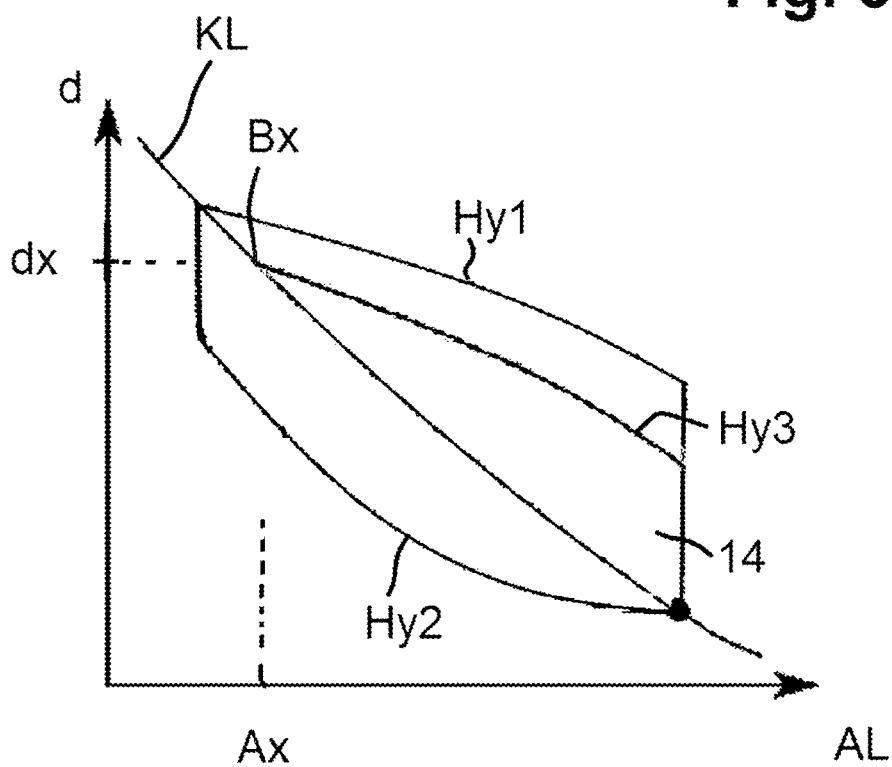
FIG. 4 shows a characteristic field when determining a spring compression process in the case of a partially loaded vehicle.

The measurement distance d therefore depends on the axle load AL. However, in particular a trapezoidal spring 6 exhibits a hysteresis behavior, which is shown in FIGS. 2 to 3 and is in particular related to the internal friction between the spring layers 9. In FIG. 2, the measurement distance d is plotted against the axle load AL. In the ideal spring characteristic curve KL, the measurement distance d accordingly decreases with increasing axle load AL, wherein in general there is a non-linear spring characteristic curve, in particular a progressive spring characteristic curve, in particular for a stack of spring layers with different lengths. Due to the friction between the spring layers 9, however, the adjustment of the measurement distance d does not follow the ideal spring characteristic curve KL, but can be reproduced by a hysteresis field 14, which is represented as a set of hysteresis curves Hyi with i=1, 2, 3, . . . , i.e. thus Hy1, Hy2, Hy3, . . . : Here, FIG. 2 first shows a loading process, i.e. a spring compression process:

A loading or unloading process is present when a first criterion or loading process criterion K1 is met; this may provide in particular that the vehicle 1 is at a standstill, i.e. v=0. Furthermore, it is preferably provided as a criterion for a loading process that the axle load AL increases, i.e. a decrease in the measurement distance d is measured. A hysteresis field 14 is preferably determined from previous measurements and stored in the memory device 11, for example as a set of hysteresis curves Hy1, Hy2, . . . , wherein the hysteresis curves Hy1, Hy2, . . . can be stored as a determined mathematical function, for example polynomials, or can also be stored as value pairs (d, AL), wherein current corresponding interpolations are then formed between these pairs of values.

The loading process starts from an initial loading point B1, which is thus specified as a value pair (d_B1, AL_B1). In general, a second criterion or relaxation criterion K2 is provided, which indicates that a point on the ideal spring characteristic curve KL has currently been reached; the second criterion indicates that the vehicle 1 has previously travelled a sufficient distance. In a subsequent loading process, successive loading points B2, B3, B4 up to for example B7 along the first (upper) hysteresis curve Hy1 are recorded, wherein for example B7 indicates full loading, so that the loading process is terminated. The hysteresis curve Hy1 is defined by the friction forces between the spring layers 9 during the loading process. The frictional forces counteract the bending of the leaf spring 6, in which the spring leaves 9 shift relative to each other under pressure load, so that a smaller measurement distance d is formed, wherein a curved hysteresis curve Hy1 is formed, which can be measured accordingly as value pairs (d_B1, AL_B1), (d_B2, AL_B2), . . . .

Since the hysteresis field 14 is pre-stored, thus when a subsequent spring compression process occurs a currently measured measurement distance d starting from B1, for example the measurement distance value d_B2, can be determined and a current axle load projection value AL_B2 can be determined directly from d_B2 on the basis of the first hysteresis curve Hy1. Thus, an error can be avoided or minimized by using the ideal spring characteristic curve KL.

Thus, the axle load, which is not directly measurable, is projected and axle load projection values are determined, i.e. according to the graphical representation by means of the hysteresis curves as values on the abscissa.

FIG. 3 shows an unloading process in which the second (lower) hysteresis curve Hy2 is followed for the unloading process. The vehicle 1 has again previously met the second criterion K2, so that the internal friction forces and tensions of the leaf spring 6 are largely reduced. Thus, an initial unloading point E1 lies with high accuracy on the ideal spring characteristic curve KL. In the subsequent unloading process, the ideal spring characteristic curve KL is not followed again, but the lower hysteresis curve Hy2 determined through E1 with points E1, E2, E3 to E7, which runs below the spring characteristic curve KL, is followed.

FIGS. 2 and 3 thus show the characteristic field 14 with hysteresis curves Hy1 and Hy2, which in particular can represent a loading of the empty vehicle 1 and an unloading of the fully loaded vehicle 1. The top first hysteresis curve Hy1, which is based on a fully loaded vehicle 1, and the bottom second hysteresis curve Hy2 define and/or limit the hysteresis field 14 as enveloping curves and thus form three envelope curves with the ideal spring characteristic curve.

The respective hysteresis curve is thus characterized by the axle load value AL of the initial loading point B1, which can however also change in principle. Thus, changes can be made to the vehicle that change the total mass of the load 8. In particular, however, vehicles can also be partially unloaded and partially loaded, so that different initial loading points B1 and different initial unloading points E1 are to be selected, which subsequently each form different upper and lower hysteresis curves Hy1, Hy2. This is shown in FIG.

4, where the first criterion K1 is used for example after a longer journey, i.e. after meeting the second criterion K2, and thus in particular the change of the measurement distance dx is checked. Thus, a decrease of the measurement distance dx is determined here, which thus corresponds to an increase of the axle load, i.e. a loading process. Thus, the initial loading point Bx with the axle load projection value Ax can be selected, which lies on the spring characteristic curve KL based on dx, and the hysteresis curve Hy3 starting from Bx can be selected, for example by interpolation of measured values and/or by a polynomial of the $n^{th}$ degree.

Thus, a reliable determination of the axle load is already possible by defining a relevant hysteresis curve Hy1, Hy2, Hyx, . . . from a hysteresis field 14 by selecting the relevant starting loading point B1 or unloading point E1. Thus, in this determination of an axle load AL as an axle load projection value, no recalculation to the ideal spring characteristic curve KL is required at first, but the current axle load projection value AL-RV or Ax can be determined directly on the basis of the hysteresis field 14.

Figure 5A:
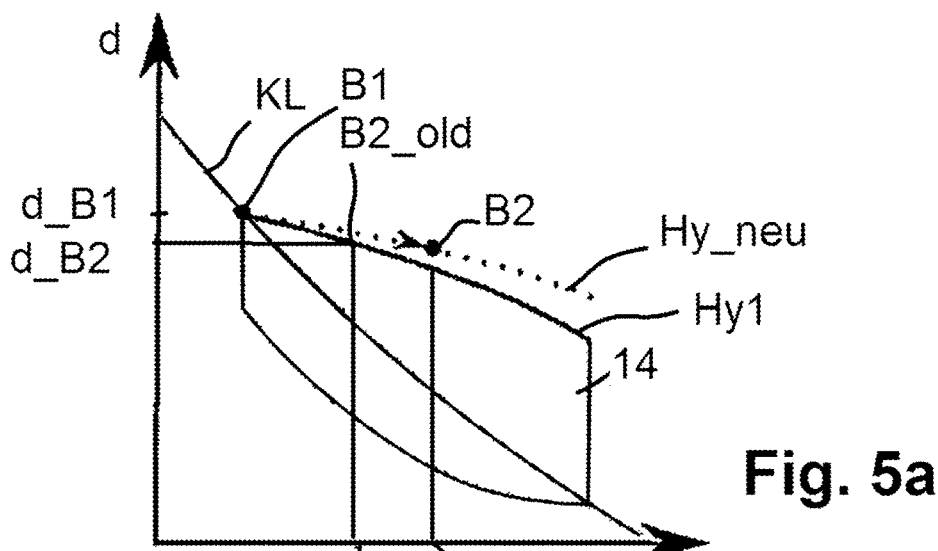
FIGS. 5a, b, c show steps for the determination or recalculation of hysteresis curves of the characteristic field.
Figure 5B:
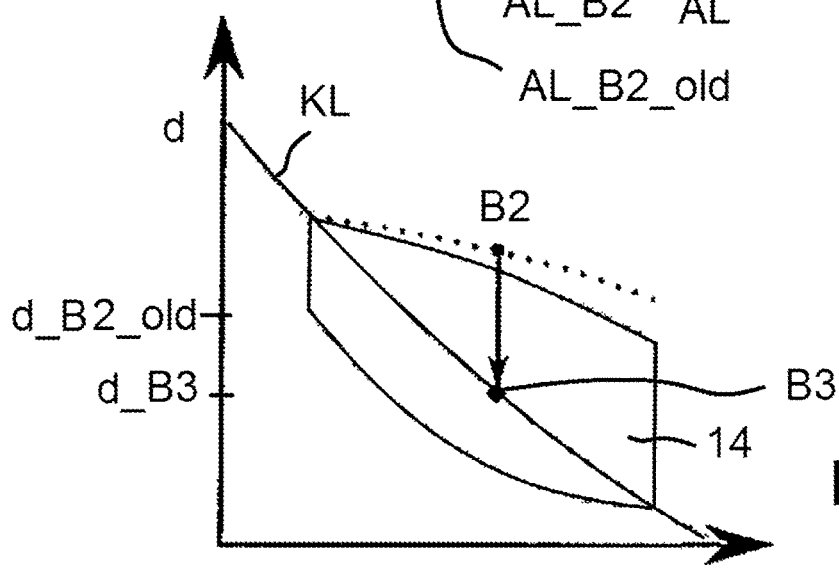
Figure 5C:
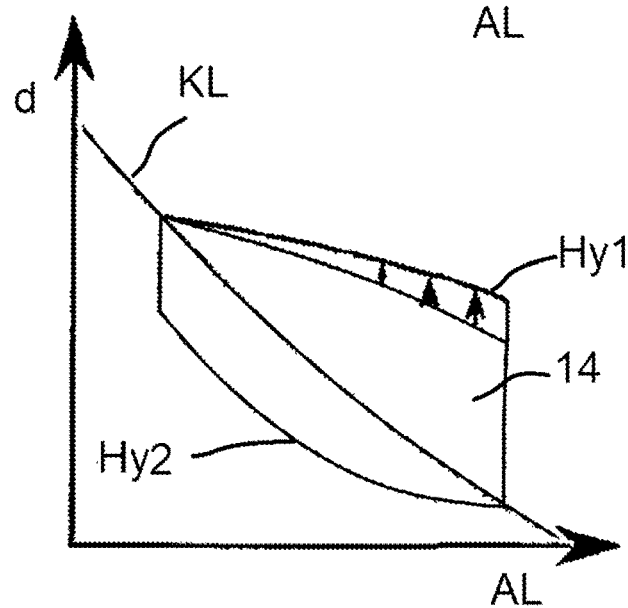

Since the hysteresis field 14 changes dynamically over time, especially due to aging or material fatigue, corrosion, changes of the interfaces and thus the frictional forces between the spring layers 9, according to a preferred design the hysteresis field 14 is continuously updated. This is shown by way of example in FIGS. 5a to 5c:

At the initial time, the hysteresis field 14 is stored. The vehicle is loaded again after a journey that meets the criterion K2, so that an initial loading point B1 can be set, which can be determined directly from the currently measured measurement distance value d_B1 and the spring characteristic curve KL. The loading actually follows the dotted line Hy_neu due to a changed hysteresis behavior until the second loading point B2 is reached during the loading process, for example. Due to the outdated or faulty hysteresis curve Hy1, the measured measurement distance value d_B2 is incorrectly assigned to the point B2_old and thus an axle load projection value AL_B2_old is determined.

Subsequently, the second criterion K2 is reset in the case of a start of a journey, in which it can therefore generally be assumed that the load 8 no longer changes. After a journey in which the second criterion K2 is again met, the ideal spring characteristic curve KL is again reached and thus the point B3 is reached again according to FIG. 5b—with the axle load AL unchanged. Thus, the measurement distance value d_B3 is subsequently measured and not the previously incorrectly determined measurement distance value d_B2_old. As a result the error can be detected qualitatively on the one hand and the current axle load projection value AL-RV can be corrected based on the currently measured measurement distance value d_B3 and the known ideal spring characteristic curve KL. Furthermore, according to FIG. 5c the hysteresis field 14 can be adjusted and the hysteresis curve Hy1 which is relevant for the loading process can be corrected, i.e. according to FIG. 5c it can be offset clearly upwards to the determined values.

Here, the new, corrected hysteresis curve Hy1 can be determined from one or more determined loading points B2. In principle, it can be determined mathematically by a suitable polynomial of the $n^{th}$ degree from the initial loading point B1 and another loading point B2.

Figure 6:
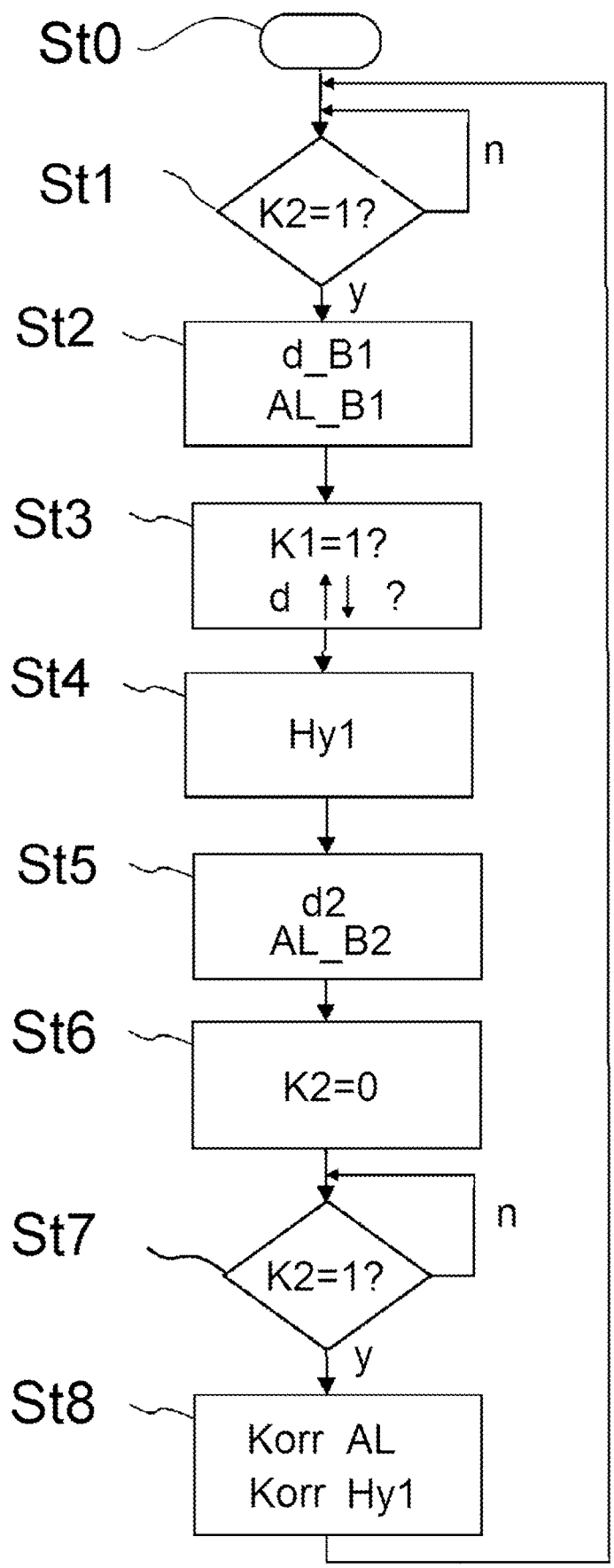
FIG. 6 shows a flow diagram of a method according to the invention.

FIG. 6 thus shows a flow diagram of a method for determining an axle load as an axle load projection value according to one embodiment:

After the start in step St0, it is then checked whether the second criterion K2 is met in step St1, i.e. K2=1, for example by comparing the journeys made since the last loading or unloading process. In particular, it is possible to check whether a journey time ($\Delta\_t$) is greater than a minimum journey time (min_$\Delta\_t$) and/or whether a journey distance ($\Delta\_s$) exceeds a minimum distance (min:$\Delta\_s$).

Here it may be provided that the journey time or distance has been consistently met in a single journey, or multiple consecutive journeys may also be permitted.

Where appropriate, it may also be checked, for example, whether a minimum speed has been maintained during the journeys.

If K2 is not met, the method is reset to before step St1; if K2 is met, it is recognized that the ideal spring characteristic curve KL can be used as a starting point for a subsequent change of the axle load.

In step St2, the measurement distance value d_B1 is then measured and from this the point B1 is determined as the current value pair (d_B1, AL_B1) by means of the ideal spring characteristic curve KL, whereby the current axle load projection value AL_B1 is determined.

It is subsequently checked in accordance with step St3 whether the first criterion K1 or loading process criterion K1 is met, i.e. there is currently a loading or unloading process, for which purpose it can be checked whether the speed v=0, for example,
whether there is a change in the measurement distance d greater than a minimum value d_min, wherein d_min allows small fluctuations,
and/or, where appropriate, an input signal from the driver is also required.

Furthermore, as part of the first criterion K1, the distinction between a loading process and an unloading process may already be provided, i.e. whether d increases or decreases.

In the present case, a decrease of d is measured, so that a loading process can be concluded in step St3. Thus, in step St4 the upper hysteresis curve Hy1 can be used, which is determined by B1 and the characteristic field 14. If, on the other hand, an unloading process is determined, i.e. d increases, thus the lower hysteresis curve Hy2 is used.

Subsequently, the new measurement distance d2 is then measured in step St5 at the end of the loading process, from which the current axle load projection value AL_B2 is determined on the basis of the hysteresis curve Hy1. This current axle load projection value AL_B2 can subsequently be indicated or also used for driving dynamics controls in which the axle load AL is incorporated, i.e. in particular for control of the axle load distribution by controlling the pneumatic springs, for braking processes and also for stabilization processes. Since a loading process is carried out while forming hysteresis behavior of the leaf spring 6, the second criterion K2 is no longer met, so that in step St6 K2 can be reset, i.e. K2=0.

Subsequently, in step St7 after for example a short journey the second criterion K2 is met again as K2=1, so that it can be assumed from this that the behavior of the leaf spring 6 again follows the ideal spring characteristic curve KL. The current measurement distance d is measured and, on the one hand, a corrected axle load projection value AL-RV is determined on the basis of the spring characteristic curve KL. Furthermore, in step St8 the hysteresis field 14 is then corrected according to FIG. 5c), a new hysteresis curve Hy1 is determined and stored in the memory device 11, whereupon the method is reset to before the step St1.

The invention claimed is:

1. A method for determining an axle load of a vehicle having a suspension system with at least one leaf spring having ends connected to spring holders of a vehicle body and having a central region connected to a chassis of the vehicle the method comprising the following steps:
    measuring a measurement distance of the vehicle body relative to the chassis,
    determining whether the vehicle is currently undergoing a loading or unloading process,
    determining a relevant hysteresis curve of a pre-stored hysteresis field depending on the determination of the loading or unloading process,
    determining a current axle load projection value from the measurement distance and the relevant hysteresis curve.

2. The method as claimed in claim 1, wherein the determination of whether there is currently a loading or unloading process of the vehicle is carried out depending on a first criterion, which includes one or more of the following conditions:
    a determination of a decrease or increase of the measured distance, an input of an activation signal and a detection of a standstill of the vehicle.

3. The method as claimed in claim 1, further comprising the following steps:
    before determining whether the vehicle is currently undergoing a loading or unloading process, checking whether a second criterion is met, which evaluates a previous journey after the last loading or unloading process, and,
    upon determining that the second criterion is met, using an ideal characteristic curve as a starting point for determining the current, axle load projection value and the relevant hysteresis curve.

4. The method as claimed in claim 3, wherein the second criterion includes checking whether a previous journey, after the last loading or unloading process a reset of the second criterion meets at least one of the following two criteria: the previous journey has a journey duration greater than a minimum journey time the previous journey has a travel distance greater than a minimum travel distance to form a sufficient number of vibrations or loadings and unloading of the at least one leaf spring.

5. The method as claimed in claim 1, wherein the hysteresis field has: an ideal spring characteristic curve, which represents a reversible elastic expansion process, at least a first hysteresis curve indicating an inelastic loading process and a second hysteresis curve indicating an inelastic unloading process.

6. The method as claimed in claim 5, wherein a first top hysteresis curve starting from n empty or fully loaded vehicle and a bottom second hysteresis curve starting from a fully loaded vehicle define and/or limit the hysteresis field.

7. The method as claimed in claim 6, wherein the hysteresis curves each contain value pairs of a measurement distance and an axle load projection value.

8. The method as claimed in claim 6, wherein a first hysteresis curve for a loading process lies on the ideal spring characteristic curve in an initial loading point and for shorter distances increasingly deviates from the ideal spring characteristic curve, and a second hysteresis curve for an unloading process lies on the ideal spring characteristic curve in an initial unloading point and increasingly deviates from the ideal spring characteristic curve for increasing distances.

9. The method as claimed in claim 1, wherein after determination of a current axle load projection value in the basis of a hysteresis curve in an unloading or loading process the second criterion is subsequently reset, and upon subsequently meeting the second criterion checking whether the determined axle load projection value and the current measurement distance are on the ideal spring characteristic curve wherein deviations from the ideal spring characteristic curve are evaluated as errors in the stored hysteresis curve and a corrected axle load projection value is determined based on the ideal spring characteristic curve.

10. The method as claimed in claim 9, wherein when a deviation of the corrected axle load projection value is determined from the axle load projection value previously determined on the basis of the hysteresis curve, a new hysteresis curve and/or a corrected hysteresis field is determined and stored in the memory device.

11. A suspension system for a vehicle with a vehicle body and a chassis, the suspension system comprising: a leaf spring having in spring holders of a vehicle body and a central region connected to a chassis of the vehicle, for suspension of the vehicle body relative to the chassis, a distance measuring device for measuring a measurement distance of the vehicle body relative to the chassis and for outputting a measurement distance measurement signal, a memory device for storing a hysteresis field, a control and evaluation device which is configured to record the measurement distance measurement signal, to determine whether there is currently a loading or unloading process of the vehicle depending on the determination of the loading process or unloading process, to determine a relevant hysteresis curve of the hysteresis field, and to determine a current axle load projection value from the measurement distance measurement signal (S1) and the relevant hysteresis curve.

12. A suspension system as claimed in claim 11, wherein the leaf spring is a stack spring or a trapezoidal spring with a stack of spring layers or spring leaves, between which friction occurs during loading and unloading processes.

13. The suspension system as claimed in claim 11, wherein the central region of the leaf spring is configured to be mounted on or against a star axle of the chassis.

14. The suspension system as claimed in claim 11, wherein the distance measuring device measures the measurement distance mechanically as a length spacing or contactlessly.

15. The suspension system as claimed in claim 11, wherein the control and evaluation device i is configured to assign a point on an ideal spring characteristic curve to a currently measured measurement distance upon determining that if a second criterion indicating a previously completed journey of the vehicle is met.

16. A vehicle comprising
    a chassis with at least one rigid axle,
    a vehicle body, and
    the suspension system as claimed in claim 11, disposed between the rigid axle and the vehicle body.

* * * * *